United States Patent Office.

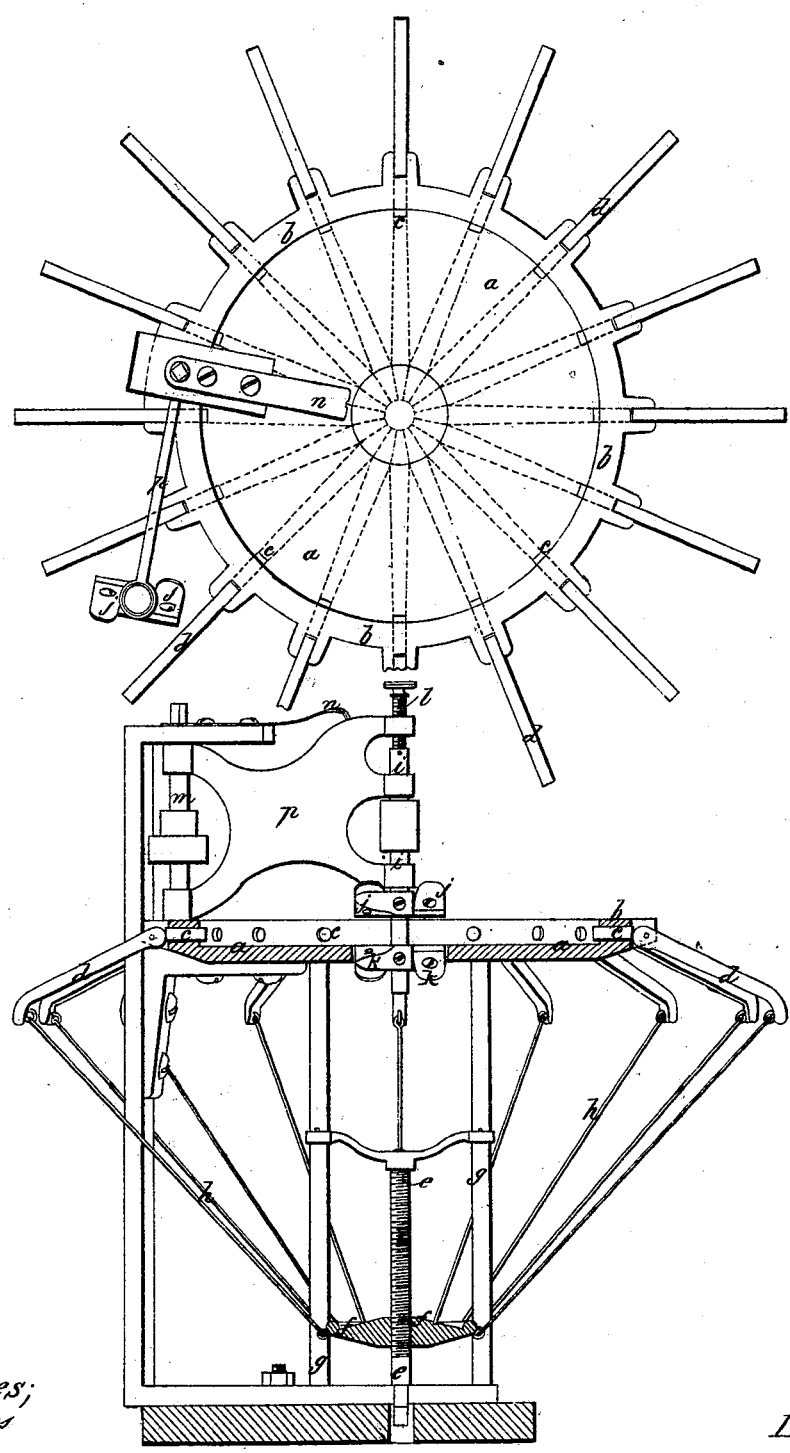

E. A. ARCHIBALD, OF METHUEN, MASSACHUSETTS.

Letters Patent No. 98,331, dated December 28, 1869.

---

IMPROVEMENT IN MACHINES FOR THE MANUFACTURE OF SPOKED WHEELS.

---

The Schedule referred to in these Letters Patent and making part of the same.

---

*To all whom it may concern:*

Be it known that I, E. A. ARCHIBALD, of Methuen, in the county of Essex, and State of Massachusetts, have invented an Improved Machine for Use in the Manufacture of Spoked Wheels; and I do hereby declare that the following, taken in connection with the drawings which accompany and form part of this specification, is a description of my invention, sufficient to enable those skilled in the art to practise it.

This machine is designed to facilitate and improve the manufacture of that class of spoked wheels used upon heavy vehicles, in which the nave-ends of wooden spokes are secured between flat nave-plates or flanges of metal, one of which has a hub, in which the axle-bearing is made, the plates or flanges being held together, clamping the nave-ends of the spokes between them, by screw-bolts, the machine acting to force into close contact with each other those plain surfaces of the spoke-ends which are in true radial planes of the wheel, and to face off the compacted nave-ends to true circular planes, on which the inner faces of the hub-plates or flanges rest.

The drawings show, in—

Figure 1, a plan of a machine embodying my invention, and in

Figure 2, a sectional elevation of the same.

*a* is a metal disk, provided with a rim, *b*, which, within its inner diameter, is large enough to receive, in position, the spokes of a wheel, to be put together thereupon, as seen in red lines in fig. 1.

The spokes are fitted with care, so that their faces, which are vertical on the plate, and which extend from the inner ends of the spokes to where the spokes diverge from each other, shall be in true radial planes of the wheel to be made.

In the rim *b* are fitted, so as to slide freely therein, as many pieces, *c*, as there are spokes in the wheel to be fitted, said pieces *c* being equally spaced around the rim, to which levers *d* are pivoted, so that there is one lever to each piece *c*, the short arm of each lever being made cam-shaped, so that as the long arms of the levers are drawn down, the pieces *c* will all be equally and powerfully driven inward against the outer ends of the spokes, thus setting the radial joints of the spokes closely and firmly together, so that the spokes cannot yield inwardly, by wear of the wheel, or by the shrinking on of the tire.

Previously to placing the spokes together on the plate *a*, I prefer to coat their radial end-surfaces with oil and white lead, which serves to fill the pores of the wood, and to keep moisture out of the joints.

It will be seen, that by the means described for forcing the spokes toward a common centre, the vertical radial surfaces before referred to do not move upon, or with relation to each other, but all move alike toward the centre, closing up any imperfection of the joints between said surfaces by actual compression of the wood, and driving out of the joints, or into the pores of the wood, any superfluity of oil and white lead.

The plate *a* is supported on suitable legs or standards, at any height above the floor convenient for the workman, and below the plate, in a continuation of its axial line, is located a screw, *e*, which can be turned in suitable bearings, there being on said screw a nut-plate, *f*, which is made to rise and fall by the turning of the screw, the nut-plate being prevented from turning because its periphery is notched to fit upon the standards *g*, which form part of the support of the plate *a*.

Connecting-rods, *h*, unite the long arms of levers *d* with the periphery of the nut-wheel *f*, so that as the nut-wheel is lowered and raised by rotation of screw *e*, the levers *d* are lowered and raised, thus forcing the pieces *c* against the spoke-ends, to press the nave-ends of the spokes together, and then relieving the spokes from end-pressure.

In practice, I apply a bevel-gear to the end of screw *e*, which gear I drive by another similar gear on a horizontal shaft, which is arranged to be rotated in either direction, by means of such appliances as are commonly used for such a purpose.

The plate *a* has a central aperture large enough to receive the hub-plate, which is to be fixed on the spoke-ends as they rest on the plate.

Attached to the frame-work of the machine is a bracket or arm, *p*, capable of being swung so that a vertical shaft, *i*, which it carries, may be brought and held with its axis in the axial line passing through the centre of plate *a*, or so that the arm may be placed in position, so that said shaft may be carried to one side, over the rim *b*, out of the way of the spokes on plate *a*.

The shaft *i* is so made that it carries the surfacing-cutters, *j* and *k*, the latter being attached to the shaft *i* by a long central stem, which enters a central socket in the lower end of said shaft, and is confined therein by a suitable screw, so that when the shaft *i* and arm *p* are to be swung off to the side of the rim *b*, the cutter *k* can be easily removed.

The shaft *i* is also arranged so that it can be moved up or down, to bring the cutters *j* and *k* into action, the function of the cutters being to true-surface the spokes for bearings or beds for the hub-plates.

The screw *l* affords the means for raising and lowering the shaft *i*, and the cutters which it carries.

The shaft *i* is driven from a pulley on the shaft *m*, which shaft is the axis on which the arm *p* swings.

To confine the arm *p*, so as to bring the shaft *i* over the nave-part of the wheel, there is fixed on the frame-work a notched spring-catch, $n$, which locks the arm $p$, when brought under the catch.

Suppose now, that the arm $p$ is in position, over one side of rim $b$, and the nut $f$ and arms $d$ elevated, and the pieces $c$ pushed back into their recesses, in rim $b$; then the spokes, which have been previously brought to equal lengths and to the proper forms, especially at the nave-ends, are placed on plate $a$, with the outer end of each opposite one end of the pieces $c$, then the nut $f$ is lowered, by turning screw $e$, in the proper direction, and the nave ends of the spokes are compressed solidly together, by the action of the cam-levers $d$ on pieces $c$ in forcing the spokes inward, the spokes being kept subject to pressure from pieces $c$ until the nave-ends of the spokes are secured and clamped between the hub-plates. The arm $p$ is then swung over the nave of the wheel, and is locked in position, and the cutter $k$ secured to shaft $i$. Then, on rotation being given said shaft, the nave-ends of the spokes are surfaced, above and below, by bringing the cutters $j$ and $k$ into action, by lowering and then raising shaft $i$ by turning screw $l$. Then the cutter $k$ is removed from shaft $i$, the arm $p$ is released from the catch $n$, and is swung around clear of the spokes, and the hub-plates are applied to the trued surfaces of the nave-ends of the spokes, which surfaces are, by preference, first coated with white lead and oil, and the hub-plates are bolted in place, thus clamping the spokes securely together. The nut $f$ is then raised, and the spider of the wheel is removed from the machine, in readiness to have the tenons cut on the outer ends of the spokes, preparatory to applying the felloe.

Wheels thus made are perfect at their centres, and the spokes never yield inwardly, so that in setting the tires, a very slight amount of expansion thereof, by heat, suffices to cause them to clamp the wheel tightly, when they are cooled.

I claim—

The pins $c$, in combination with the disk $a$, when arranged to be operated substantially as shown and described, and for the purpose specified.

Also, the cutters $j$ and $k$, or either of them, in combination with the disk $a$ and clamping-mechanism, when constructed and arranged to operate upon either of the exposed surfaces of the nave-ends of the spokes, substantially as described, and for the purpose specified.

Also, the arm $p$, pivoted as described, and arranged so as to swing to position over the wheel-centre, and to be locked there, while one or both faces of the nave-ends are being faced by the cutter or cutters borne by the arm, and so that said arm may be unlocked and swung outward, clear of the spokes, substantially as described.

E. A. ARCHIBALD.

Witnesses:
  WM. M. ROGERS,
  THOS. G. GRASSIE.